(12) United States Patent
Pattison (10) Patent No.: US 11,500,188 B2
(45) Date of Patent: Nov. 15, 2022

(54) MICROSCOPE WITH FOCUSING SYSTEM

(71) Applicant: Andor Technology Limited, Belfast (GB)

(72) Inventor: Allister Pattison, Ballynure (GB)

(73) Assignee: Andor Technology Limited, Belfast (GB)

( * ) Notice: Subject to any disclaimer, the term of this patent is extended or adjusted under 35 U.S.C. 154(b) by 293 days.

(21) Appl. No.: 16/857,218

(22) Filed: Apr. 24, 2020

(65) Prior Publication Data

US 2020/0341254 A1 Oct. 29, 2020

(30) Foreign Application Priority Data

Apr. 25, 2019 (GB) ..................................... 1905815

(51) Int. Cl.
*G02B 21/24* (2006.01)
*G02B 21/36* (2006.01)
*G02B 21/00* (2006.01)

(52) U.S. Cl.
CPC ......... *G02B 21/242* (2013.01); *G02B 21/244* (2013.01); *G02B 21/365* (2013.01); *G02B 21/002* (2013.01)

(58) Field of Classification Search
CPC .. G02B 21/242; G02B 21/244; G02B 21/365; G02B 21/002; G02B 7/36; G02B 27/34; G02B 21/0088; G02B 21/006
See application file for complete search history.

(56) References Cited

U.S. PATENT DOCUMENTS

| 5,604,344 | A |   | 2/1997 | Finarov |
| 10,146,041 | B1 | * | 12/2018 | Putman ................ G02B 21/242 |

FOREIGN PATENT DOCUMENTS

GB 2313508 A 11/1997

OTHER PUBLICATIONS

IPO Search Report dated Oct. 25, 2019, for corresponding Application No. GB1905815.5; Filing Date: Apr. 25, 2019 consisting of 1-page.

* cited by examiner

*Primary Examiner* — Robert E. Tallman
(74) *Attorney, Agent, or Firm* — Christopher & Weisberg, P.A.

(57) ABSTRACT

A microscope comprises a microscope objective, a camera and an imaging optical system for imaging an object through the objective to the camera along a first optical path. A projection optical system is provided for projecting a test image onto the object through the objective, and the imaging optical system is configured to image the projected test image from the object to the camera through the objective and along at least part of the first optical path. A focus adjustment system is provided for focusing the test image at the camera. Using the same objective and the same camera for both imaging and focusing allows reduction of the cost of the microscope in comparison with known microscopes that provide separate focusing systems.

19 Claims, 9 Drawing Sheets

MICROSCOPE WITH FOCUSING SYSTEM

CROSS-REFERENCE TO RELATED APPLICATION

This application is related to and claims priority to Great Britain Patent Application Serial No. 1905815.5, filed Apr. 25, 2019, entitled MICROSCOPE WITH FOCUSING SYSTEM, the entirety of which is incorporated herein by reference.

FIELD

This invention relates to focusing in microscopes. The invention relates particularly, but not exclusively, to compensating for focus drift in microscopes.

BACKGROUND

The term focus drift refers to a microscope's inability to maintain a selected focal plane over time, for example as a result of changes in temperature or mechanical shocks or vibrations. The imaging quality delivered by a microscope can be adversely affected by focus drift, particularly when operating at high axial resolutions.

It is known to compensate for focus drift in microscopes by providing a focus correction system that is separate from the imaging system. Typically, an infra-red (IR) reference beam, spatially separated from the microscope's imaging axis, is injected into the infinity space above or below the microscope's objective. The returning, also spatially separated, IR signal, is then detected and imaged using a dedicated imaging path that is separate from the microscope's primary imaging path. This arrangement enables continuous closed-loop feedback on a reference surface to provide focus correction, but at the expense of requiring a dedicated imaging path for focus correction.

It would be desirable to support focus drift compensation in a microscope without requiring a dedicated imaging path for this purpose. More generally, it would also be desirable to provide a relatively inexpensive focusing system for microscopes.

SUMMARY

This disclosure generally relates to a microscope and relate to a first aspect the invention provides a microscope comprising:
a microscope objective;
at least one camera;
an imaging optical system configured to image an object through said objective to said at least one camera along a first optical path;
a projection optical system configured to project a test image onto said object through said objective; and
a focus adjustment system,
wherein said imaging optical system is configured to image the projected test image from said object to said at least one camera through said objective and along at least part of said first optical path, said focus adjustment system being operable to focus said test image at said at least one camera.

Preferably, said microscope is operable in a focusing mode in which said projection optical system projects said test image onto said object, said imaging optical system images the projected test image from said object to said at least one camera, and said focus adjustment system focuses said test image at said at least one camera. The microscope is typically operable in an imaging mode in which said imaging optical system images said object to said at least one camera. The projection optical system is preferably disabled in said imaging mode.

In preferred embodiments, said projection optical system is configured to project said test image onto said object along part of said first optical path.

In preferred embodiments, a first beam splitter is included in said imaging optical system in said first optical path, and wherein said projection optical system is configured to project said test image onto said object by means of said first beam splitter. Said projection optical system may include an optical projector, said first beam splitter being configured to split light from said optical projector into first and second portions, and to direct said first portion to said objective to project said test image onto said object through said objective. Said beam splitter may be configured to direct said first portion to said objective to project said test image onto said object along part of said first optical path.

Typically, said optical projector includes a first light source configured to generate light in a first frequency band, said first beam splitter being configured to split light in said first frequency band. Said first beam splitter may be configured to reflect said first portion of light and to transmit said second portion of light. In preferred embodiments, said first light source comprises an infra red (IR) or near infra red (NIR) light source or a white light source.

In preferred embodiments, the microscope includes an irradiation optical system comprising a second light source for irradiating said object. The irradiation optical system may be configured to direct light from said second light source onto said object through said first beam splitter. The second light source may be configured to produce light in a second frequency band, and wherein said first beam splitter is configured to transmit light in said second frequency band. Preferably, in said focus correction mode, said second light source is disabled. Typically, said second light source comprises at least one laser device.

In preferred embodiments, said first beam splitter is configured to transmit light in a frequency band corresponding to fluorescent light emanating from said object in use.

In preferred embodiments, the microscope includes a stage for receiving said object, wherein said focus adjustment system is operable to focus said test image at said at least one camera by effecting relative movement between said stage and said objective along an optical axis.

Typically, said at least one camera is a digital camera having a digital image sensor, and wherein said focus adjustment system is operable to focus said test image on said image sensor.

The microscope may include at least one sensor for sensing one or more environmental parameter of the microscope, said microscope being configured to adopt said focusing mode in response to input from said at least one sensor. Said at least one sensor may comprise at least one temperature sensor, and wherein said microscope is configured to adopt said focusing mode in response to said at least one temperature sensor detecting a change in temperature, or temperature gradient, greater than a threshold amount. Said at least one sensor may comprise at least one shock sensor and/or at least one vibration sensor, and wherein said microscope is configured to adopt said focusing mode in response to said at least one shock or vibration sensor detecting shock or vibration greater than a threshold amount.

The microscope may include at least one movement sensor for detecting movement of said objective or of the stage, said microscope being configured to adopt said focusing mode in response to said at least one movement sensor detecting movement of said objective or stage greater than a threshold amount.

Said microscope may be configured to adopt said focusing mode periodically, or in response to user input. Said focus adjustment system may be operable manually.

Typically, said focus adjustment system comprises means for effecting relative movement between the objective and the object.

Typically, said focus adjustment system comprises a controller programmed to perform contrast detection autofocusing.

In preferred embodiments, said at least one camera comprises a first camera, said imaging optical system being configured to image said object through said objective to said first camera along said first optical path, and wherein said imaging optical system is configured to image the projected test image from said object to said first camera through said objective and along said first optical path, said focus adjustment system being operable to focus said test image at said first camera. Optionally, said at least one camera comprises only said first camera.

Alternatively, said at least one camera comprises a first camera and a second camera, said imaging optical system being configured to image said object through said objective to said first camera along said first optical path, and wherein said imaging optical system is configured to image the projected test image from said object to said second camera through said objective and along part of said first optical path, said focus adjustment system being operable to focus said test image at said second camera. A beam splitter may be provided in said first optical path for reflecting a test image beam towards said second camera.

From a second aspect the invention provides a method of focus adjustment in a microscope having an imaging optical system for imaging an object to at least one camera through an objective along a first optical path, the method comprising:

projecting a test image onto said object through an objective;

imaging the projected test image from said object to said at least one camera through said objective; and focusing said test image at said at least one camera.

Advantageously, the same objective and preferably also the same camera are used both for imaging and focusing. This arrangement allows reduction of the cost of the microscope in comparison with known microscopes that provide separate focusing systems. In preferred embodiments, the optical imaging system and camera are used to implement focus drift correction. This arrangement dispenses with the need for an additional dedicated imaging system for focus drift correction, which reduces the expense and complexity of the microscope.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
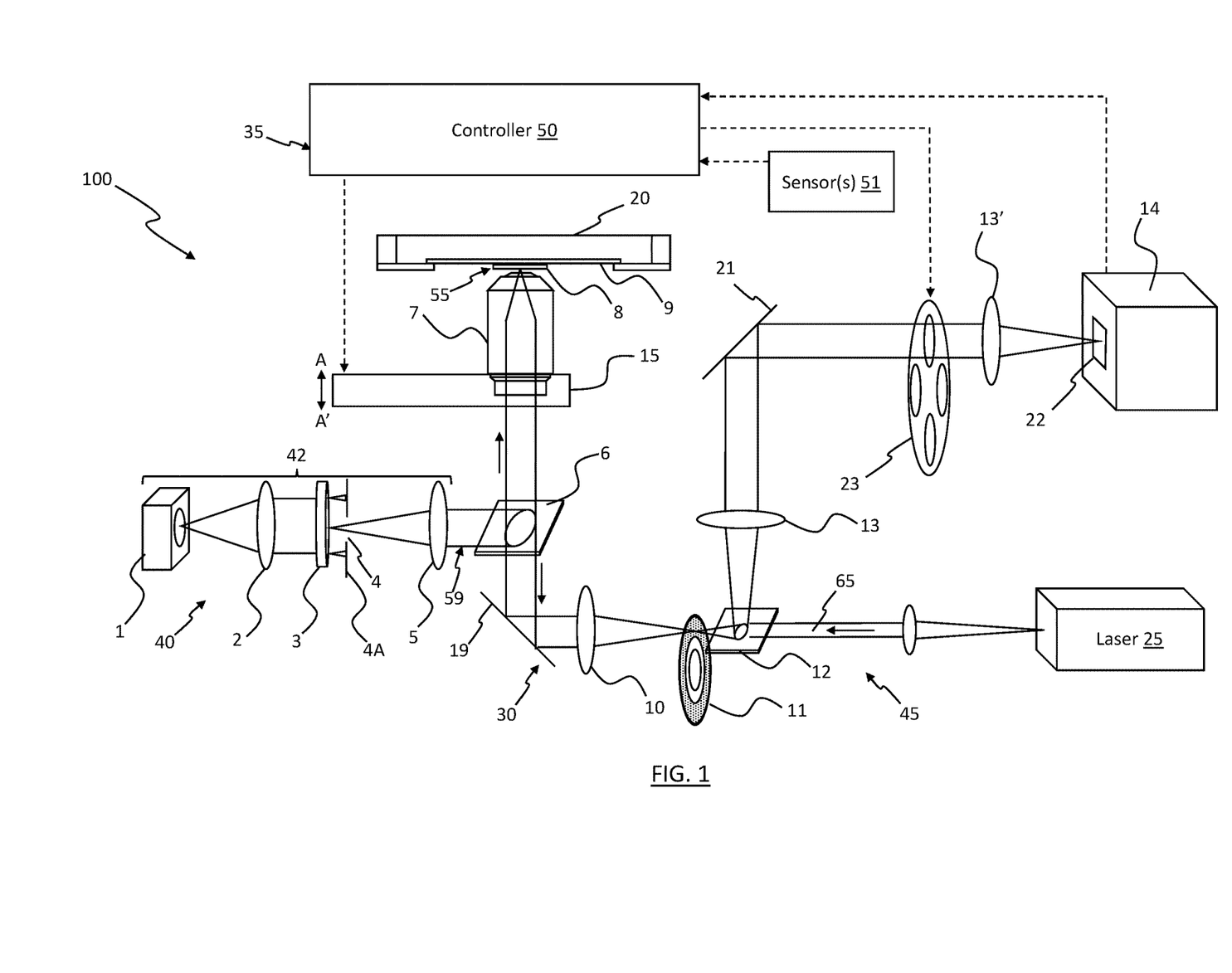
FIG. 1 is a schematic diagram of a microscope embodying one aspect of the present invention.

Referring now to the drawings there is shown, generally indicated as 100, a microscope embodying one aspect of the invention. The microscope 100 is an optical microscope, and in the illustrated embodiment is a spinning disk confocal microscope, although microscopes embodying the invention may be of other conventional types as would be apparent to a skilled person.

The microscope 100 includes a stage 20 for receiving an object 55 to be imaged. The object 55 typically comprises a slide 9 on which a specimen, for example a biological specimen, is located. The specimen is typically immersed in a medium 16, e.g. water. A cover slide 8 may be placed over the specimen, as required.

The microscope 100 includes an imaging optical system 30 for imaging the object 55 to a camera 14 along an optical path. In particular, it is desired that the imaging optical system 30 focuses an image of the object 55 at a focal plane of the camera 14. The imaging optical system 30 comprises a train of optical devices, typically comprising at least one lens and optionally at least one mirror, arranged to image the object 55 to the camera 14, i.e. form an image of the object 55 at the camera 14 via the optical train. The imaging optical system 30 comprises a microscope objective 7, preferably an infinity-corrected microscope objective. The preferred imaging optical system 30 also comprises a tube lens 10, configured to form an intermediate image of the object 55 at, for example, a confocal spinning pinhole disk 11. Optionally, a mirror 19 is provided between the objective 7 and the tube lens 10, and is configured to cause the excitation beam to be correctly aligned to the optical axis of the objective 7. In the illustrated embodiment, the imaging optical system 30 includes first and second image plane relay lenses 13, 13' between the tube lens 10 and the camera 14. Optionally, a mirror 21 is provided between the relay lenses 13, 13', the mirror 21 being configured to cause a fluorescence beam to be optimally aligned to the optical axis of the second relay lens 13'. In alternative embodiments (not illustrated) the imaging optical system may include any other suitable arrangement of lenses and, if required, mirror(s).

In preferred embodiments, the camera 14 is a digital camera having a digital image sensor 22, for example a CCD sensor. The imaging optical system 30 images the object 55 to the image sensor 22. More particularly, it is desired that the imaging optical system 30 focuses an image of the object 55 on the sensor 22 (wherein the image sensing surface of the sensor 22 is located at the focal plane of the imaging optical system 30).

The microscope 100 includes a focus adjustment system 35 for adjusting the imaging optical system 30 and/or the stage 20 in order to focus an image of the object 55 at the camera 14. The focus adjustment system 35 comprises means for effecting relative movement between the stage 20 and the objective 7 in an axial direction that corresponds to the optical axis of the objective 7. In typical embodiments, the objective 7 is movable with respect to the stage 20, and therefore the object 55, in the axial direction. To this end, the objective 7 is carried by a movable support structure 15, typically an objective turret. In the illustrated embodiment, the turret 15, and therefore the objective 7, is movable in the direction indicated by arrows A-A'. The turret 15 may include, or be coupled to, a drive system (not shown), for example a motorised drive system or a piezo-electric drive system, for moving the turret 15 in the direction A-A'. Any suitable conventional motorised drive system may be used. Movement of the objective 7 towards and away from the object 55 in the axial direction adjusts the focus of the image at the camera 14. As such the movable objective assembly 7, 15 provides part of the focusing system 35. Typically, the stage 20 is stationary during focusing and the objective 7 moves relative to it. Alternatively, the stage 20 may be moved axially with respect to the objective 7, in which case the objective 7 may be held stationary during focusing. More generally, either one or both of the objective 7 and the stage 20 may be movable axially towards and away from one another to adjust the focus.

The focus adjustment system 35 also includes a controller 50 for controlling movement of the objective 7 (and/or of the stage 20 as applicable) in order to focus the image at the camera 14. The controller 50 may take any conventional form, typically comprising a suitably programmed processor, e.g. a microprocessor or microcontroller. The focus adjustment system is preferably configured to perform auto-focusing of the image at the camera 14. To this end, the camera 14 and/or the microscope 100 may include any conventional autofocusing means. For example, the controller 50 may be programmed to perform contrast detection autofocusing using any conventional contrast detection autofocusing algorithm. To perform contrast detection autofocusing, the controller 50 may monitor the intensity of light detected by at least some of the pixels of the sensor 22 and move the objective 7 to control, e.g. maximize, the detected light intensity in accordance with the contrast detection autofocusing algorithm. Alternatively, the camera 14 and/or the microscope 100 may be configured to perform phase detection autofocusing.

The microscope 100 includes an irradiation optical system 45 for irradiating the object 55, and in particular the specimen included in the object 55. The irradiation optical system 45 comprises a light source 25, which in preferred embodiments comprises one or more laser devices, but may alternatively comprise any other suitable conventional light source, for example one or more LEDs, or one or more incandescent bulb. The light source 25 may be configured to produce light in one or more frequency bands as suits the application and as would be apparent to a skilled person. For example, in cases where the object 55 comprises a specimen that is capable of fluorescence (either because it is inherently capable of fluorescence, i.e. auto-fluorescence, or because one or more fluorescent markers (e.g. proteins or dyes) have been added to the specimen), the light source 25 may be configured to provide light in one or more frequency bands that excites the specimen/markers and causes fluorescence. In preferred embodiments, the irradiation optical system 45 is configured to irradiate the object 55 by directing light (laser beam 65 in the present example, which may comprise light at any one of a plurality of wavelengths corresponding to the fluorescence characteristics of the specimen/markers) to the object along at least part of the optical path defined by the imaging optical system 30. In particular, the irradiation optical system 45 is configured to irradiate the object 55 through the objective 7. To facilitate this, a beam splitter 12 is included in the imaging optical system 30. The beam splitter 12 is configured to be transmissive to light in one or more frequency bands corresponding to the light produced by the laser device 25. The laser device 25 is arranged to direct the laser beam 65 through the beam splitter 12 and onto the optical path whereupon it is directed to the object 55 through the objective 7. The beam splitter 12 is configured to be reflective (or at least partly reflective) to light in one or more frequency band corresponding to light that is reflected from, or emitted from, the object 55. The beam splitter 12 may be said to have one or more reflection band corresponding to light that is reflected from, or emitted from, the object 55, and a transmission band corresponding to the light produced by the laser device 25. In the illustrated embodiment, the beam splitter 12 is located between the tube lens 10 and the first relay lens 13, and arranged to reflect light that passes through the tube lens 10 to the first relay lens 13. Typically, the beam splitter 12 comprises a dichroic mirror.

In the illustrated embodiment, the microscope 100 is configured to perform spinning disk confocal laser microscopy and the irradiation optical system 45 includes a spinning disk 11 onto which the laser beam 65 is directed. The spinning disk 11 includes pinholes (not shown) and may be part of a spinning disk assembly that includes a corresponding spinning collector disk (not shown) with microlenses. The spinning disk 11, or spinning disk assembly, acts as a scanner and causes the object 55 to be irradiated with an array of laser beams produced from the laser beam 65. The spinning disk 11 is located at an intermediate image plane in the optical path of the imaging optical system 30. In the illustrated embodiment, the spinning disk 11 is located between the tube lens 10 and the beam splitter 12.

In alternative embodiments in which the microscope 100 is not a confocal spinning disk microscope, the spinning disk 11 may be omitted. In embodiments in which the microscope uses laser scanning to irradiate the object 55, any other conventional laser scanning system may be provided. In other embodiments, the irradiation optical system 45 may be arranged to irradiate the object 55 from behind, i.e. through the stage 20.

In typical embodiments, the object 55 includes a specimen that fluoresces (either by auto-fluorescence or by means of fluorescent markers (or labels) included in the specimen) when excited by the light from the irradiation optical system 45. Therefore, when the microscope 100 operates in an imaging mode, it is fluorescent light emitted from the specimen that is imaged by the imaging optical system 30 to the camera 14.

During operation of the microscope 100, the focusing of the image at the camera by the imaging optical system 30 can drift for various reasons, including shock, vibrations, changes in temperature or thermal gradients in the microscope, or as a result of slippage in the focusing mechanism. The microscope 100 includes a projection optical system 40 which, together with the focus adjustment system 35, can be used to correct focus drift.

The projection optical system 40 is configured to project a test image onto the object 55 through the objective 7. As such the objective 7 is shared by the projection optical system 40 and the imaging optical system 30.

The projection optical system 40 includes an optical projector 42 for projecting the test image. The optical projector 42 comprises a light source 1, which in preferred embodiments is a near-infrared (NIR) light source, for example comprising one or more LEDs. The light source 1 may alternatively take other forms, for example a lamp or any conventional non-coherent light source. Advantageously, the light source 1 is configured to produce light in a frequency band that is different than, and preferably non-overlapping with, the frequency band of the light source 25. In preferred embodiments, the light produced by the light source 1 is also a frequency band that is different than, and optionally non-overlapping with, the frequency band of the light emitted from the object 55 during imaging, i.e. the fluorescence of the specimen. The preferred arrangement allows the beam splitter 6 to be fully transmitting in the fluorescence band, but a mirror only for NIR. In alternative embodiments, the light source 1 may be configured to produce light in any convenient frequency band(s), including the same frequency band(s) as the light source 25 and/or the fluorescence of the specimen. Optionally, the light source 1 may be configured to produce white light. The light source 1 may comprise any suitable conventional light source, for example one or more LEDs, or one or more laser.

To create the test image, the projector 42 includes an aperture 4, which may be formed in a plate 4A or other convenient structure, through which light from the light source 1 passes. In alternative embodiments, the test image may be created by any other convenient means.

The projector 42 may include a collimating lens 2 for collimating the light from the light source 1, typically located between the light source 1 and the aperture 4. The projector 42 may also include an optical diffuser 3, which may be located between the collimating lens 2 and the aperture 4. A collimating lens 5 may also be provided in front (with respect to the direction of travel of the light) of the aperture 4 for collimating the light passing through the aperture 4.

The projector 42 produces a test image beam 59 which is directed to the objective 7 in order to project the test image onto the object 55. Advantageously, the test image beam 59 is directed to the objective 7 along part of the optical path defined by the imaging optical system 30. To this end, a beam splitter 6 is included in the optical path of the imaging optical system 30. The projection optical system 40 is configured to project the test image onto the object 8,9 via the beam splitter 6. In particular, the projector 42 is arranged to direct the test image beam 59 onto the beam splitter 6. The beam splitter 6 is configured to split the test image beam 59 into a first portion 62 and a second portion 63, to direct the first portion 62 to the objective 7 in order to project the test image onto the object 8,9. In preferred embodiments, the beam splitter 6 reflects the first portion 62 from a reflecting face 61 towards the objective 7. The second portion 63 of the beam 59 is transmitted through the beam splitter 6 and may be directed to a beam dump 64. Accordingly, the beam splitter 6 introduces the first portion 62 of the test image beam 59 onto the optical path towards the objective 7. As such, the part of the optical path between the splitter 6 and the object 8,9, including the objective 7, is shared by the projector optical system 40 and the imaging optical system 30.

The beam splitter 6 is configured to split light in a frequency band corresponding to the light 59 projected by the projector 42. This frequency band may be referred to as the reflection band. The beam splitter 6 splits the light 59 such that the first portion 62 is reflected and the second portion 63 is transmitted. Preferably, the beam splitter 6 is configured to cause a 50/50 split between the portions 62, 63. In the illustrated embodiment, the beam splitter 6 is located between the tube lens 10 and the objective 7. Typically, the beam splitter 6 comprises a dichroic mirror. More generally however, the beam splitter 6 may be any optical element that reflects any portion of the light 59 to the objective 7, while allowing at least some of the light reflected by or emitted from the object 55 to pass through it. For example, the beam splitter 6 may comprise a window with a suitable anti-reflective coating.

The beam splitter 6 is configured to be transmissive to light in a frequency band corresponding to the light produced by the laser device 25. In the present context transmissive may be taken as meaning that approximately 90% or more of the relevant light is transmitted, although this definition is not limiting to the invention. This frequency band may be referred to as the first transmission band. In preferred embodiments, the beam splitter 6 is also transmissive to light that is emitted from the object 55 during imaging, i.e. the fluorescence of the specimen. This frequency band may be referred to as the second transmission band. The first and second transmission bands may be separate from each other, or may wholly or partly overlap, depending on the requirements of the application. For example, the first and second transmission bands may be within a single transmission band of the beam splitter 6, or the beam splitter 6 may support separate transmission bands corresponding to the first and second transmission bands. The reflection band may or may not overlap with the transmission band(s), as suits the application.

The irradiation optical system 45 is configured to direct light from the laser device onto the object 55 through the beam splitter 6. The beam splitter 6 is located in the optical path such that the laser beam 65 impinges upon the beam splitter 6, and passes though the beam splitter 6 because the beam splitter 6 is transmissive to the laser light.

Figure 2:
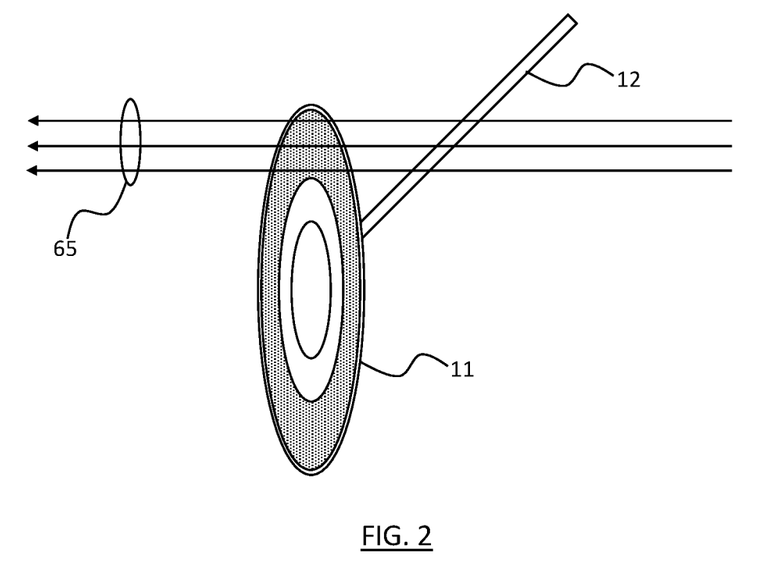
FIG. 2 is a schematic diagram of part of the microscope of FIG. 1, illustrating the delivery of an excitation beam for imaging.
Figure 3:
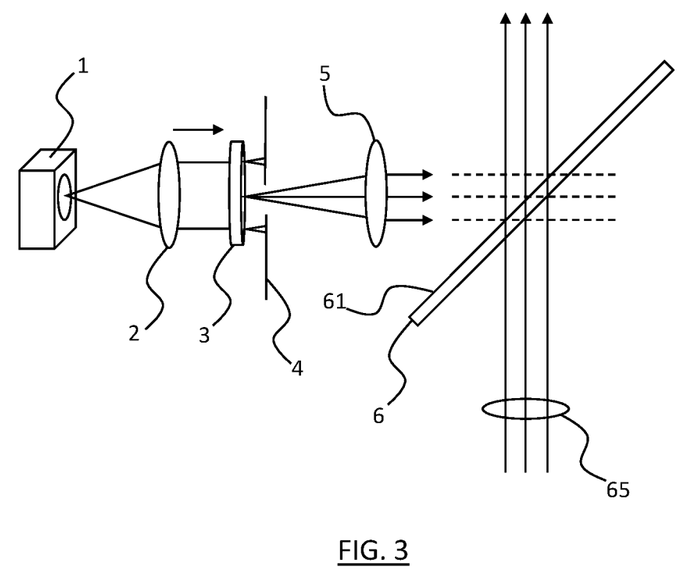
FIG. 3 is a schematic diagram of part of the microscope of FIG. 1, illustrating the passage of the excitation beam along part of a first optical path.
Figure 4:
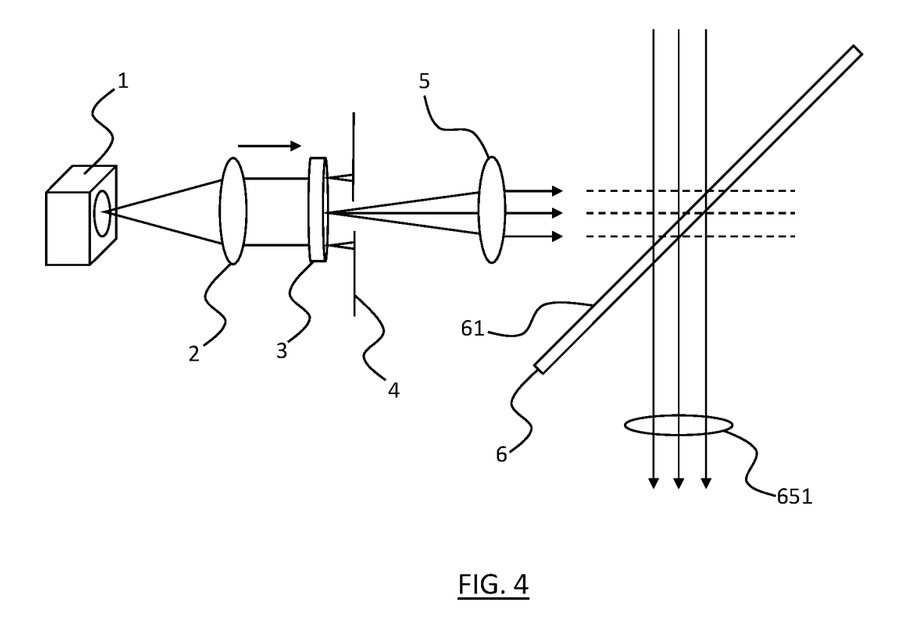
FIG. 4 is a schematic diagram of part of the microscope of FIG. 1, illustrating the passage of a sample fluorescence signal along part of the first optical path.
Figure 5:
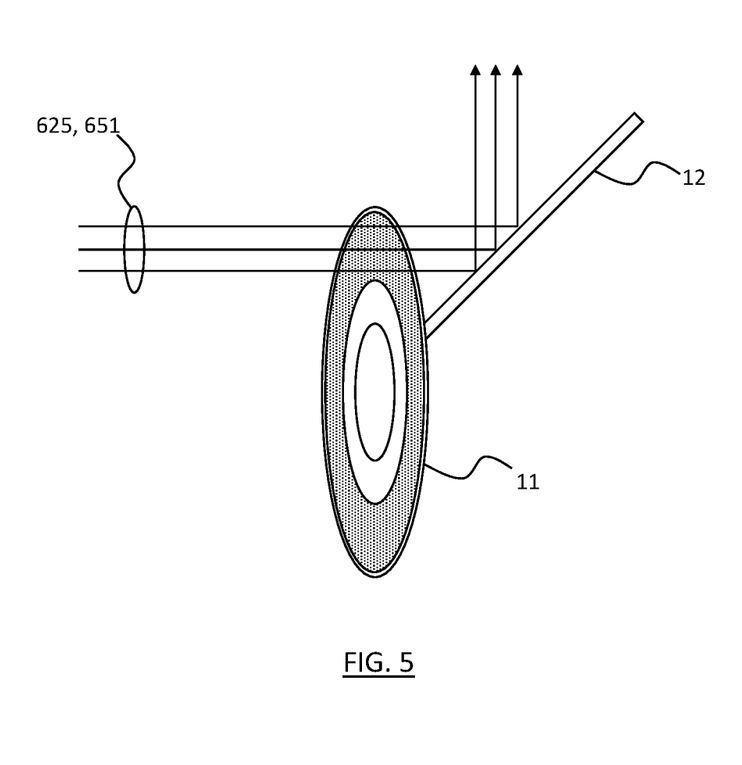
FIG. 5 is a schematic diagram of part of the microscope of FIG. 1, illustrating the passage of the sample fluorescence signal, or a reflected test beam, along part of the first optical path.

The microscope 100 is operable in an imaging mode in which the object 55 is imaged to the camera 14 by the imaging optical system 30. In the imaging mode, the irradiation optical system 45 irradiates the object 55 with the laser beam 65. In preferred embodiments, and as can best be seen from FIGS. 2 and 3, the laser beam 65 is transmitted through the beam splitter 12 and the spinning disk 11 (when present), and is also transmitted through the beam splitter 6, after which it reaches the objective 7 and is directed onto the object 55. In applications where the object 55 comprises a fluorescent specimen, the laser beam 65 acts as an excitation beam that excites fluorescence of the specimen. The resulting fluorescent light 651 is gathered by the objective 7, directed along the optical path and imaged at the camera 14. In preferred embodiments, and as can best be seen from FIGS. 4 and 5, the fluorescent beam 651 is transmitted through the beam splitter 6 and the spinning disk 11 (when present), and is reflected by the beam splitter 12, directing it to the relay lenses 13, 13' and subsequently to the camera 14 to create an image of the object 55 at the camera 14. During imaging, the imaging optical system 30 may focus the image at the camera 14 by any conventional means, including the focus adjustment system 35.

When the microscope 100 is in the imaging mode, the projection optical system 42 is optionally disabled such that it does not project the test image onto the object 55. For example the projector 42 may be switched off or otherwise disabled (e.g. deflected or diverted) such that it does not direct the test image beam 59 onto the beam splitter 6.

In order to allow any focus corrections that may be required, the preferred microscope 100 is operable in a focus correction mode. In the focus correction mode, the projection optical system 40 projects the test image onto the object 55, and the imaging optical system 30 images the projected test image from the object 55 to the camera 14. The focus adjustment system 35 is operated to focus the test image at the camera 14, thereby correcting the focus as required.

Figure 6:
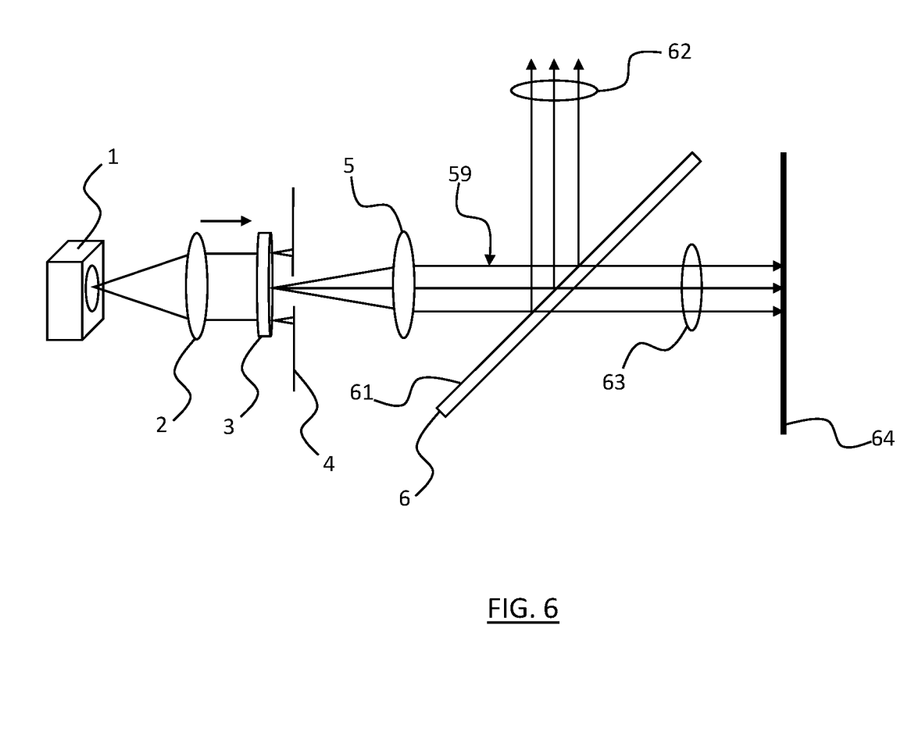
FIG. 6 is a schematic diagram of part of the microscope of FIG. 1, illustrating the projection of a test image.

In preferred embodiments, and as can best be seen from FIG. 6, the test image beam 59 is split by the beam splitter 6 such that a portion 62 of it is directed to the objective 7 thereby projecting the test image onto the object 55. The portion 62 of the test image beam 59 is reflected from the object 55 back to the objective 7 to allow it to be imaged by the imaging optical system 30. Reflection may occur at one or more interfaces of the object 55 where a refractive index discontinuity exists.

Figure 7A:
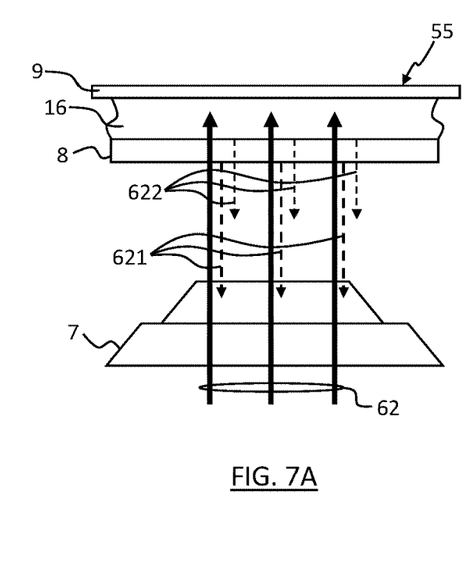
FIG. 7A is a schematic diagram of the reflection of the test image from a sample in the case where the microscope has an air objective.
Figure 7B:
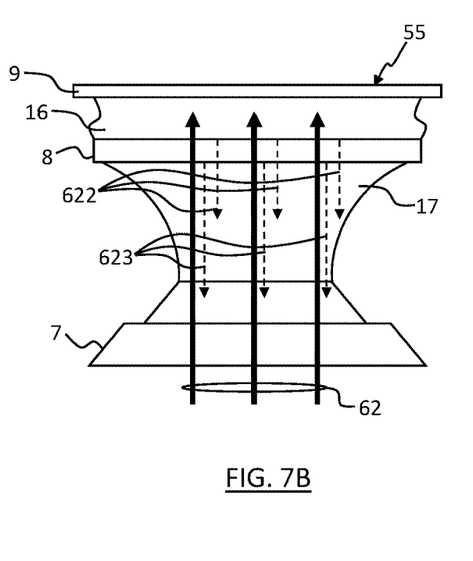
FIG. 7B is a schematic diagram of the reflection of the test image from a sample in the case where the microscope has a water immersed objective.
Figure 7C:
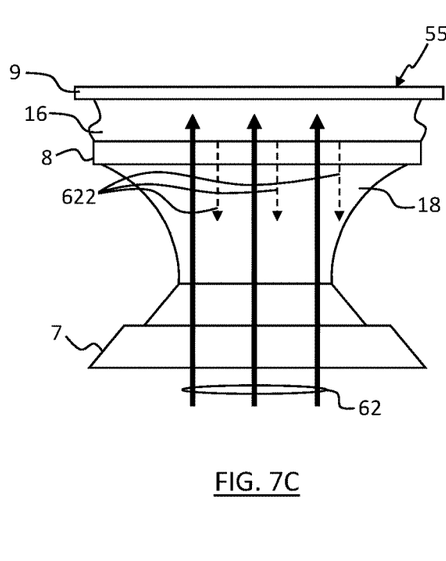
FIG. 7C is a schematic diagram of the reflection of the test image from a sample in the case where the microscope has an oil immersed objective.

FIGS. 7A, 7B and 7C illustrate how the portion 62 of the test image beam 59 may be reflected from the object 55 to allow it to be imaged to the camera 14. In FIG. 7A, it is assumed that the medium between the objective 7 and the object 55 is air. The test image beam portion 62 is reflected at the interface between the air and the obverse face of the cover slip 8 (illustrated by reflected light 621), and also at the interface between the reverse face of the cover slip 8 and the specimen medium 16 (illustrated as reflected light 622). In FIG. 7B, it is assumed that the medium 17 between the objective 7 and the object 55 is water. The test image beam portion 62 is reflected at the interface between the water 17 and the obverse face of the cover slip 8 (illustrated by reflected light 623), and also at the interface between the reverse face of the cover slip 8 and the specimen medium 16 (illustrated as reflected light 622). In FIG. 7C, it is assumed that the medium 17 between the objective 7 and the object 55 is oil. The test image beam portion 62 is reflected at the interface between the reverse face of the cover slip 8 and the specimen medium 16 (illustrated as reflected light 622). More generally, depending on the type of objective 7, and on the composition of the object 55, the test image beam 59 may be reflected at one or more interfaces of the object 55, in particular any interface where there is a change of refractive index. Commonly, for objects 55 having a cover slip 8, the most detectable reflection occurs at the interface at the obverse surface of the cover slip 8 (as illustrated by reflections 621 and 623).

Figure 8:
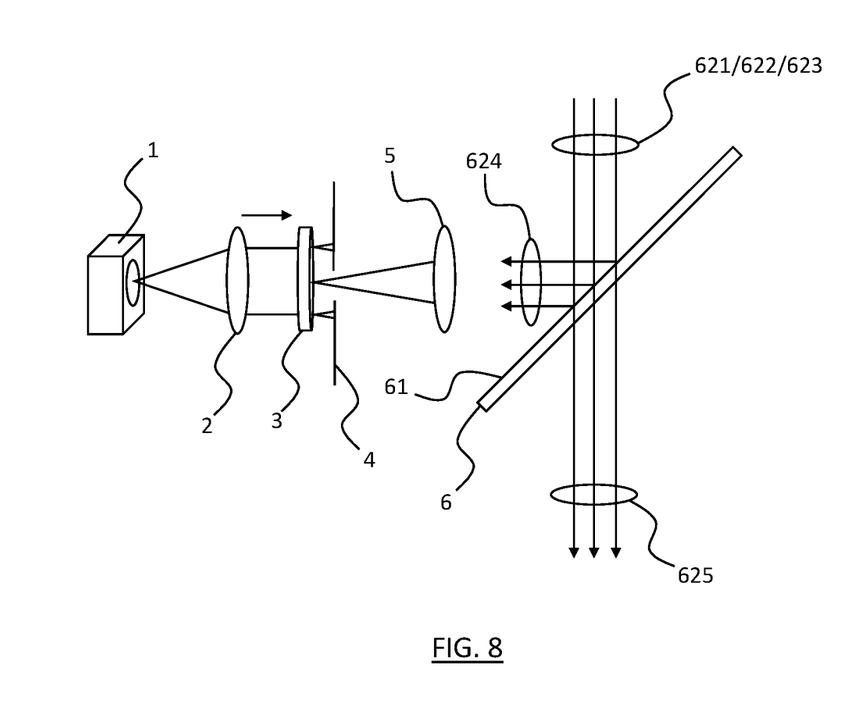
FIG. 8 is a schematic diagram of part of the microscope of FIG. 1, illustrating the passage of the reflected test beam along part of the first optical path.

In any case, the reflected light 621, 622, 623 (as applicable) is gathered by the objective 7 and imaged to the camera 14 along the optical path as a reflected test image beam. In preferred embodiments, and as can best be seen from FIG. 8, the reflected test image beam 621, 622, 623 impinges upon the beam splitter 6 which splits the reflected test image beam 621, 622, 623 such that a portion 625 of it is transmitted though the beam splitter 6 and continues along the optical path. Another portion 624 of the reflected test image beam is reflected by the beam splitter 6 and is diverted from the optical path, typically towards the projector 42. In preferred embodiments, and as can best be seen from FIG. 5, the transmitted portion 625 of the reflected target image beam is transmitted through the spinning disk 11 (when present), and is reflected by the beam splitter 12, directing it to the relay lenses 13, 13' and subsequently to the camera 14 to create an image of the target image at the camera 14. The focus adjustment system 35 may be operated to focus the test image at the camera 14 based on any one or other of the reflected light components 621, 622, 623, or any other light reflected by the object 55, as desired.

The microscope 100 may be caused to adopt the focus correction mode (typically by the controller 50) periodically and/or in response to one or more detected events including any one or more of: a detected change in temperature or temperature gradient in the microscope 100 above a threshold amount; vibration above a threshold level; mechanical shock above a threshold level; mechanical drift in the focusing mechanism, e.g. movement of the turret 15. To this end, one or more conventional sensors 51 (e.g. temperature sensor(s), vibration sensor(s), movement sensor(s) and/or shock sensor(s)) may be included in the microscope 100. The sensor(s) 51 may provide signals to the controller 50 in response to which the controller 50 may determine whether or not to cause the microscope 100 to adopt the focus correction mode. If imaging is being performed, the microscope 100 may switch to the focus correction mode and then back to the imaging mode once focus correction has been performed. Alternatively, or in addition, the microscope 100 may be operable manually by a user to adopt the focus correction mode.

Optionally, the microscope 100 may be operable in a manual focusing mode in which a user can manually set the focus of the microscope 100 using the projection optical system 40. To this end, the microscope 100 may be configured to allow the user to manually move the objective 7 (and/or stage 20 as applicable) in order to focus the test image at the camera. The microscope 100 may be operable in a user-initiated auto-focusing mode in which the microscope 100, in response to activation by the user, operates the projection optical system 40 and focuses the test image at the camera. The microscope 100 may subsequently adopt the imaging mode after focusing is complete, or in response to user input.

When the microscope 100 is in any of its supported focusing modes (which in preferred embodiments include any one or more of the focus correction mode, the manual focusing mode or the user-initiated auto-focusing mode), the irradiation optical system 45 is optionally disabled such that it does not irradiate the object 55. For example the laser device 25 may be switched off or otherwise disabled, e.g. deflected or diverted.

In preferred embodiments, an emission filter 23A is provided in the optical path between the beam splitter 12 and the camera 14 for preventing any portion of the light 65 from light source 25 that is reflected by the beam splitter 12 towards the camera 14 from reaching the camera 14. For example, the emission filter may be configured to pass fluorescent light emitted from the object 55 but to block light in the frequency band(s) emitted by the light source 25. During focusing, unless the emission filter includes a pass band corresponding to the wavelength of the light from the projector system 40, the emission filter is removed from the optical path. Conveniently, the emission filter 23A is provided in a filter selector device 23 that is operable to move the emission filter into and out of the optical path as required. The filter selector device 23 may comprise a rotatable wheel. The filter selector device 23 may include an optically transparent window 23B, or a suitable filter, or a void, that may be moved into alignment with the optical path during the relevant focusing mode.

In preferred embodiments, the microscope 100 operates in either the imaging mode, or any one of its supported focusing modes, but does not perform imaging and focusing simultaneously. When focusing, the microscope 100 uses the projection optical system 40 to focus the test image at the camera 14, either automatically or with user input as applicable, as described above. The result of the focusing is to cause the microscope 100 to adopt a reference focus state. In the reference focus state there is a reference axial distance between the objective 7 and the object 55, or more particularly between the objective 7 and whichever interface of the object 55 was used to perform the focusing. In some embodiments, during the imaging mode, the objective 7 is moved relative to the stage 20 in the axial direction, or vice versa, with respect to the reference focus state. For example in embodiments where the microscope 100 is a scanning microscope, the scanning that is performed during the imaging mode may involve relative axial movement of the objective 7 and the stage 20 with respect to the reference focus state.

Figure 9:
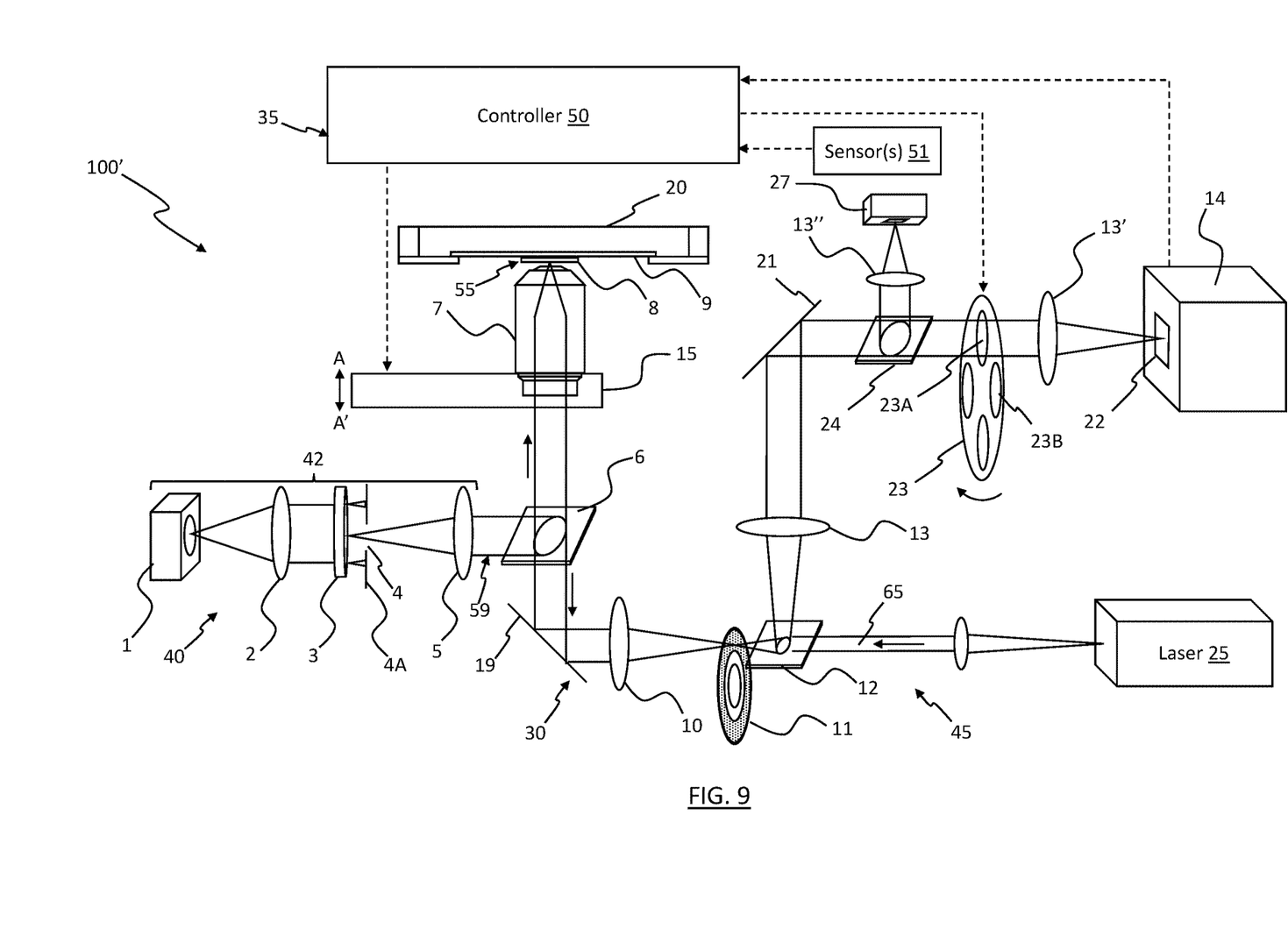
FIG. 9 is a schematic diagram of an alternative microscope embodying the invention.

FIG. 9 shows an alternative embodiment of the microscope 100' in which like numerals are used to denote like parts and in which the same or similar description applies as is provided in respect of FIGS. 1 to 8 unless otherwise indicated. The microscope 100' differs from the microscope 100 in that it includes a second camera 27. The second camera 27 is used to focus the test image in any of the supported focusing modes. To facilitate this, a beam splitter 24 is included in the imaging optical system 30. The beam splitter 24 is configured to be transmissive to light in one or more frequency band corresponding to the light that emanates from the object 55 during the imaging mode (typically the fluorescence of the specimen), and to be reflective (or at least partly reflective) to light in one or more frequency band corresponding to light that is reflected from the object 55 during focusing, i.e. the light originating from the light source 1. The beam splitter 24 is provided in the optical path of the imaging optical system 30 and arranged to reflect the relevant light to the second camera 27, away from the optical path to the first camera. The beam splitter 24 may be a dichroic mirror.

The beam splitter 24 may be located between the first and second relay lenses 13, 13'. A third relay lens 13" may be provided between the beam splitter 24 and the second camera 27, and may be arranged to be co-operable with the first relay lens 13 during focusing.

In the imaging mode, the first camera 14 is used to image the object 55 as described above. In any of the supported focusing modes, the test image reflected from the object 55 is imaged to and focused at the second camera 25. This may be achieved in the same manner as described above in relation to the embodiment of FIGS. 1 to 8.

In preferred embodiments, the same objective 7 and preferably also the same camera 14 are used both for imaging and focusing. This arrangement allows reduction of the cost and size of the microscope in comparison with known microscopes that provide separate focusing systems.

The invention is not limited to the embodiment(s) described herein but can be amended or modified without departing from the scope of the present invention. It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A microscope comprising:
a microscope objective;
at least one camera;
an imaging optical system configured to image an object through said objective to said at least one camera along a first optical path, said imaging optical system being configured to form an intermediate image of the object an at intermediate image plane;
a projection optical system comprising a first light source and being configured to project a test image onto said object through said objective; and
a focus adjustment system,
wherein said imaging optical system is configured to image the projected test image from said object to said at least one camera through said objective and along at least part of said first optical path, said focus adjustment system being operable to focus said test image at said at least one camera,
the microscope further comprising:
a first beam splitter included in said imaging optical system in said first optical path, and wherein said projection optical system is configured to project said test image onto said object by means of said first beam splitter;
an irradiation optical system comprising a second light source directed onto a spinning pinhole disk for irradiating said object, said spinning pinhole disk being located at said intermediate image plane, said irradiation optical system being configured to direct light from said second light source onto said object via said first beam splitter; and
a second beam splitter included in said imaging optical system in said first optical path, wherein said irradiation optical system is arranged to direct light from said second light source onto said spinning pinhole disk via said second beam splitter, and said imaging optical system is arranged to image said object to said at least one camera via said second beam splitter.

2. The microscope of claim 1, wherein said microscope is operable in a focusing mode in which said projection optical system projects said test image onto said object, said imaging optical system images the projected test image from said object to said at least one camera, and said focus adjustment system focuses said test image at said at least one camera.

3. The microscope of claim 1, wherein said microscope is operable in an imaging mode in which said imaging optical system images said object to said at least one camera, and wherein, preferably, said projection optical system is disabled in said imaging mode.

4. The microscope of claim 1, wherein said projection optical system is configured to project said test image onto said object along part of said first optical path.

5. The microscope of claim 1, wherein said projection optical system includes an optical projector, said first beam splitter being configured to split light from said optical projector into first and second portions, and to direct said first portion to said objective to project said test image onto said object through said objective, and wherein, preferably, said beam splitter is configured to direct said first portion to said objective to project said test image onto said object along part of said first optical path.

6. The microscope of claim 5, wherein said optical projector includes a first light source configured to generate light in a first frequency band, said first beam splitter being configured to split light in said first frequency band, and wherein, preferably, said first beam splitter is configured to reflect said first portion of light and to transmit said second portion of light, and wherein, preferably, said first light source comprises an infra red (IR) or near infra red (NIR) light source or a white light source.

7. The microscope of claim 1, wherein said second light source is configured to produce light in a second frequency band, and wherein said first beam splitter is configured to transmit light in said second frequency band.

8. The microscope of claim 1, wherein said microscope is operable in a focusing mode in which said projection optical system projects said test image onto said object, said imaging optical system images the projected test image from said object to said at least one camera, and said focus adjustment system focuses said test image at said at least one camera, and wherein, in said focusing mode, said second light source is disabled.

9. The microscope of claim 1, wherein said second light source comprises at least one laser device.

10. The microscope of claim 1, wherein said first beam splitter is configured to transmit light in a frequency band corresponding to fluorescent light emanating from said object in use.

11. The microscope of any claim 1, further including a stage for receiving said object, wherein said focus adjustment system is operable to focus said test image at said at least one camera by effecting relative movement between said stage and said objective along an optical axis.

12. The microscope of claim 1, wherein said at least one camera is a digital camera having a digital image sensor, and wherein said focus adjustment system is operable to focus said test image on said image sensor.

13. The microscope of claim 2, comprising at least one sensor for sensing one or more environmental parameter of the microscope, said microscope being configured to adopt said focusing mode in response to input from said at least one sensor, and wherein said at least one sensor may comprise: at least one temperature sensor, wherein said microscope is configured to adopt said focusing mode in response to said at least one temperature sensor detecting a change in temperature, or temperature gradient, greater than a threshold amount.

14. The microscope of claim 13, wherein said at least one sensor comprises at least one shock sensor and/or at least one vibration sensor, and wherein said microscope is configured to adopt said focusing mode in response to said at least one shock or vibration sensor detecting shock or vibration greater than a threshold amount.

15. The microscope of claim 2, comprising at least one movement sensor for detecting movement of said objective or of the stage, said microscope being configured to adopt said focusing mode in response to said at least one movement sensor detecting movement of said objective or stage greater than a threshold amount.

16. The microscope of claim 1, wherein said at least one camera comprises a first camera, said imaging optical system being configured to image said object through said objective to said first camera along said first optical path, and wherein said imaging optical system is configured to image the projected test image from said object to said first camera through said objective and along said first optical path, said focus adjustment system being operable to focus said test image at said first camera, and wherein, preferably, said at least one camera comprises only said first camera.

17. The microscope of claim 1, wherein said at least one camera comprises a first camera and a second camera, said imaging optical system being configured to image said object through said objective to said first camera along said first optical path, and wherein said imaging optical system is configured to image the projected test image from said object to said second camera through said objective and along part of said first optical path, said focus adjustment system being operable to focus said test image at said second camera, and wherein, preferably, a beam splitter is provided in said first optical path for reflecting a test image beam towards said second camera.

18. A method of focus adjustment in a microscope having an imaging optical system for imaging an object to at least one camera through an objective along a first optical path, the method comprising:
   projecting a test image onto said object through an objective via a first beam splitter and using a first light source;
   imaging the projected test image from said object to said at least one camera through said objective;
   focusing said test image at said at least one camera; and
   irradiating said object using second light source directed onto a spinning pinhole disk located at an intermediate image plane, said light from said second light source being directed onto said object via said first beam splitter,
   wherein said irradiating includes directing said light from said second light source onto said spinning pinhole disk via a second beam splitter, and wherein said imaging includes imaging said object to said at least one camera via said second beam splitter.

19. The microscope of claim 1, wherein a filter selector device is provided between the second beam splitter and said at least one camera, said filter selector device being operable to move an optically transparent window, or a filter or a void into alignment with said first optical path when said focus adjustment system is operated to focus said test image at said at least one camera.

* * * * *